United States Patent [19]
Feintuch et al.

[11] 3,989,209
[45] Nov. 2, 1976

[54] APPARATUS FOR GUIDING AN AIRCRAFT ALONG A MULTI-SEGMENT PATH WHEN LANDING THE CRAFT

[75] Inventors: Martin W. Feintuch, Paramus; Mark Kaplan, North Bergen, both of N.J.

[73] Assignee: The Bendix Corporation, Teterboro, N.J.

[22] Filed: June 26, 1974

[21] Appl. No.: 483,348

[52] U.S. Cl. .......................... 244/184; 235/150.22; 235/150.27; 244/189; 343/107
[51] Int. Cl.² .......................................... G05D 1/12
[58] Field of Search ............ 73/178 T; 235/150.22, 235/150.26, 150.27; 244/77 A, 77 B, 77 C, 184, 189; 318/583; 343/107, 108 R

[56] References Cited
UNITED STATES PATENTS

| | | | |
|---|---|---|---|
| 3,110,458 | 11/1963 | Bishop | 244/77 A |
| 3,355,126 | 11/1967 | Oppedahl | 244/77 C |
| 3,573,827 | 4/1971 | DeBottom et al. | 343/108 R |
| 3,824,381 | 7/1974 | Swern | 244/77 A X |

*Primary Examiner*—Stephen G. Kunin
*Attorney, Agent, or Firm*—Anthony F. Cuoco

[57] ABSTRACT

For use with a microwave landing system of the type including a ground based station for generating a relatively wide aircraft navigational beam and airborne equipment for deriving precision azimuth, elevation, and range data therefrom, airborne equipment utilizing the data to guide the craft along a multi-segment path so that each of the segments is asymptotically captured by the craft.

12 Claims, 3 Drawing Figures

APPARATUS FOR GUIDING AN AIRCRAFT ALONG A MULTI-SEGMENT PATH WHEN LANDING THE CRAFT

BACKGROUND OF THE INVENTION

1. Field of the Invention

This invention relates generally to controlling an aircraft when landing the craft and particularly to controlling the craft along a multi-segment path toward the center line of a beam transmitted from a ground base station, and which beam center line defines a runway.

2. Description of the Prior Art

Present day Instrument Landing Systems (ILS) provide guidance for an aircraft through a single localizer or glide slope beam with limited area coverage. Microwave Landing Systems (MLS) generate a wide area beam and thus enable the initiation of multi-segment approaches to beam center line so as to allow more aircraft in the terminal area. In such a multi-segment approach it is necessary that each of the aircraft follow rigidly defined segments to beam center line, specifically in the area of segment switching, so as to minimize the possibility of collision.

SUMMARY OF THE INVENTION

This invention contemplates apparatus of the type described and responsive to signals corresponding to the bearing of the aircraft relative to the segment to be captured, the displacement of the aircraft from said segment, the aircraft ground speed and the distance from the segment at which a turn toward the segment is to be initiated, as well as discrete information regarding whether the aircraft is flying toward or turning toward the segment. These signals are processed to provide a signal corresponding to an aircraft roll angle command so that asymptotic capture of the segments is assured in the presence of various wind and airspeed conditions. A segment capture mode for conditions when the aircraft departs from the segment is provided.

The main object of this invention is to provide means for utilizing the relatively wide area of coverage of a beam transmitted from a microwave landing system ground based station for guiding an aircraft along a multi-segment path toward the center of the beam.

Another object of this invention is to guide the aircraft for asymptotically capturing each of the segments.

Another object of this invention is to guide the aircraft for asymptotically capturing each of the segments under various wind and airspeed conditions.

Another object of this invention is to accommodate conditions when the aircraft is flying toward, turning toward and departing from the segment.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention. Although the invention will be described with reference to the lateral flight of an aircraft, it is to be understood that the device described is operative for longitudinal flight as well.

DESCRIPTION OF THE INVENTION

Present day Instrument Landing Systems (ILS) provide terminal area coverage of approximately ±3° around the center line of a localizer or glide slope beam. This restricted terminal area coverage allows only straight-in approaches to a runway. However, with the development of Microwave Landing Systems (MLS) which have expanded terminal area coverage and provide accurate range, azimuth and elevation angle information, other than straight-in approaches, such as multi-segment approaches, can be defined and flown.

Figure 1:
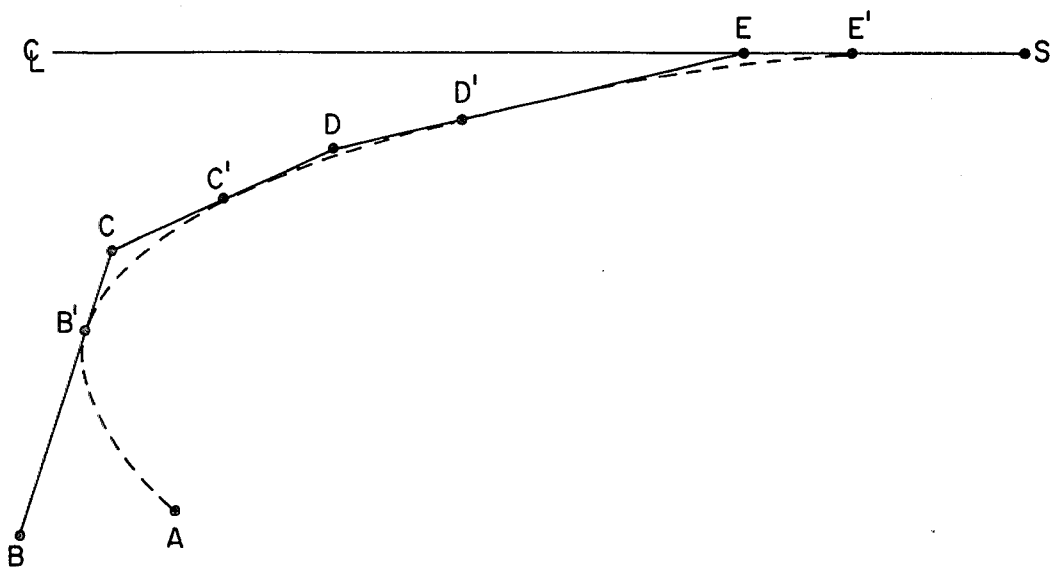
FIG. 1 is a diagrammatic representation of the flight path geometry involved when an aircraft flies a multi-segment path toward a beam center line when landing.

The particular geometry involved in flying a multi-segment path when landing an aircraft is shown in FIG. 1. An aircraft is at a point A and it has been determined, in consideration of traffic and other conditions, that it would be desirable to fly a path including segments BC, CD and DE until the center line of an MLS beam transmitted by a ground base station S is captured at a point E'. The present invention permits flying such a multi-segment path and, further, permits asymptotic capture of each of the beam segments; that is segment BC is adymptotically captured at point B', segment CD is likewise captured at point C', segment DE is likewise captured at point D' and the beam center line is asymptotically captured at point E'.

Figure 2:
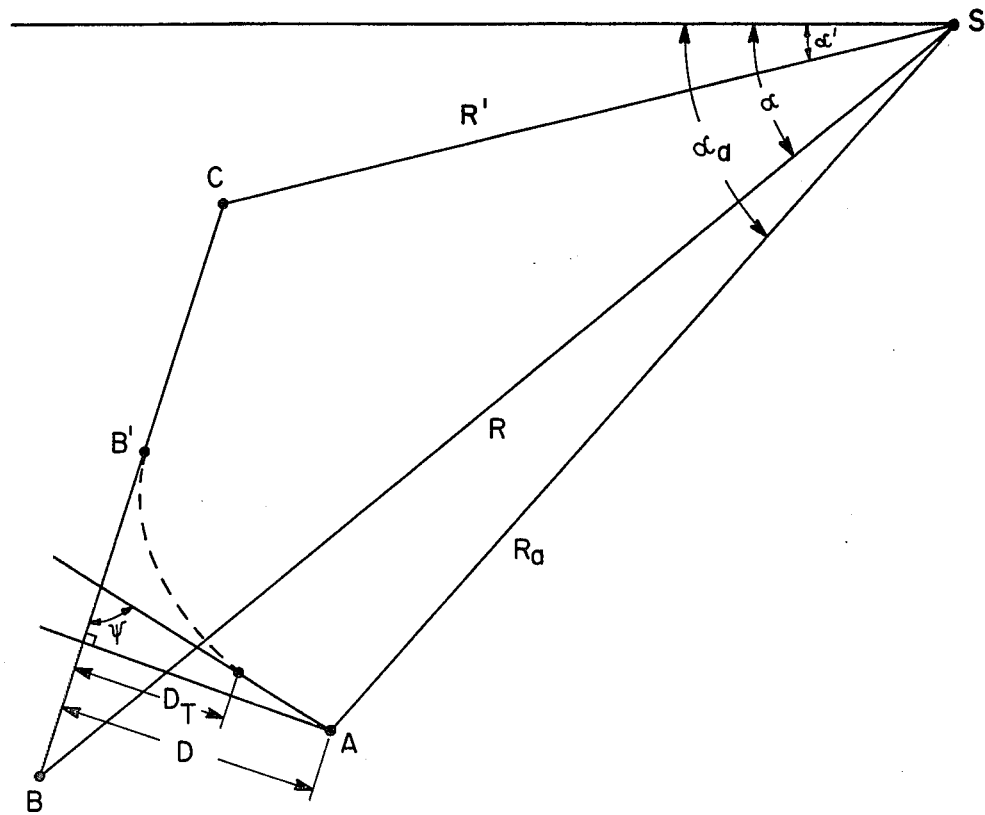
FIG. 2 is a enlarged diagrammatic representation of a section of FIG. 1, and wherein parameters required for accomplishing the above according to the invention are indicated.

With reference to FIG. 2, wherein segment BC is shown enlarged form for purposes of describing the invention, information provided by the implementation of the invention for guiding the flight of an aircraft along segment BC includes the bearing of the craft relative to the segment and defined as $\psi$, the displacement of the aircraft from the segment and defined as D, aircraft ground speed defined as $V_G$ and the distance from the segment to initiate a turn toward the segment and defined as $D_T$. Further, discrete information is provided as to whether the aircraft is flying toward the segment or turning toward said segment as will be further described.

Figure 3:
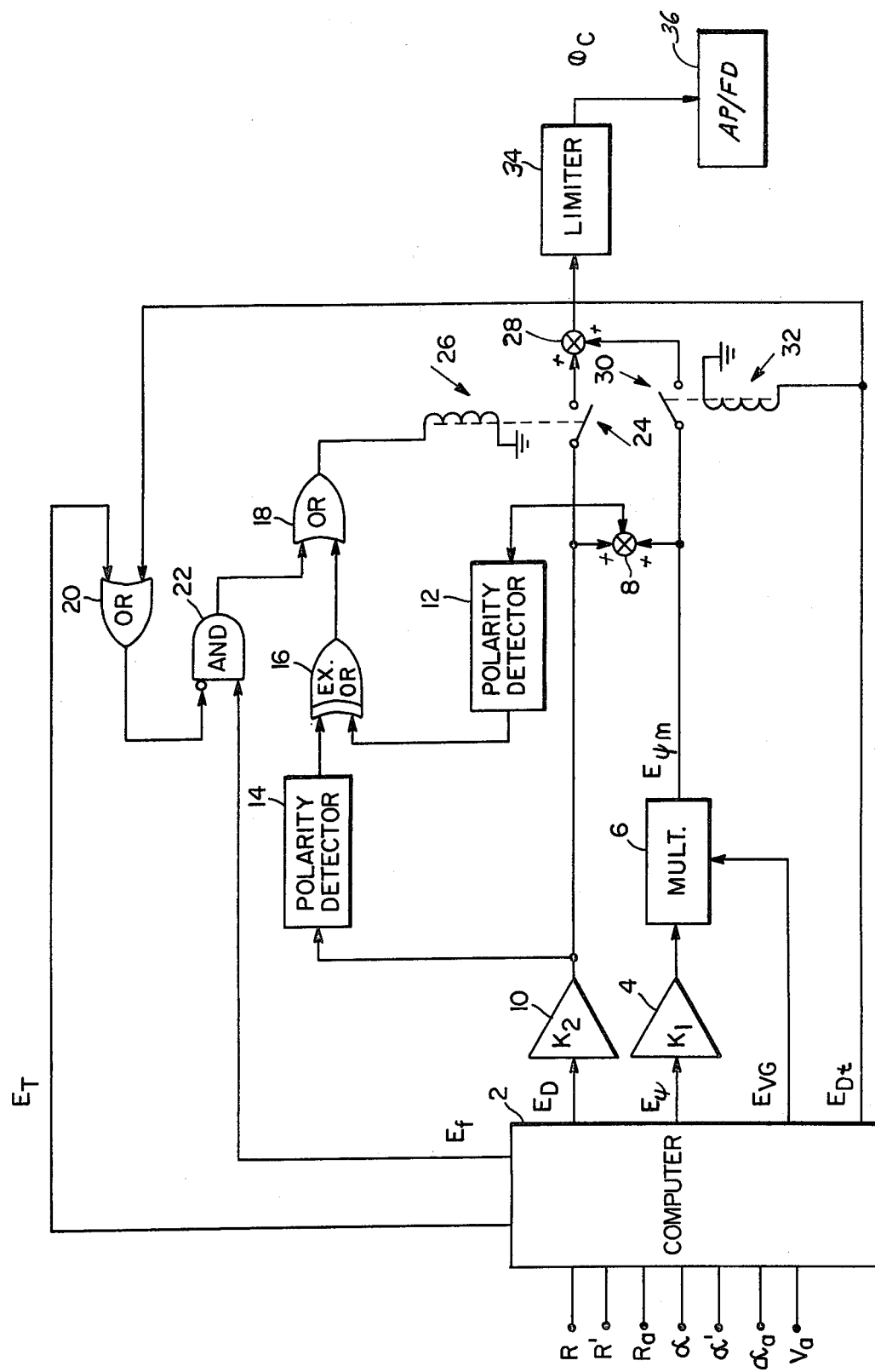
FIG. 3 is a block diagram of a system according to the invention wherein an aircraft is guided along the multi-segment path with each of the segments being asymptotically captured.

The aforegoing information is computed by an on board computer designated by the numeral 2 in FIG. 3 in response to pilot generated signals and signals generated by the Microwave Landing System with which the invention may be used. For this purpose, the pilot, in accordance with a desired or selected path to be flown, actuates a signal source for providing a signal corresponding to the range of the beginning of segment BC from station S and defined as R in FIG. 2, a signal corresponding to the range of the end of segment BC to station S and defined as R', a signal corresponding to the azimuth angle $\alpha$ from the beginning of the segment to the beam center line and a signal corresponding to the azimuth angle $\alpha'$ from the end of the segment to the beam center line. The microwave landing system generates a signal corresponding to the range of the aircraft from station S and defined as $R_a$ and a signal corresponding to angle $\alpha_a$ which is the azimuth angle from the aircraft at point A to the beam center line. As shown in FIG. 3, signals R, R', $R_a$, $\alpha$, $\alpha'$ and $\alpha_a$, and an airspeed signal $V_a$ provided by an on-board airspeed sensor are applied to computer 2 which processes the signals to provide digital signals $E_D$, $E_\psi$, $E_{VG}$ and $E_{Dt}$ corresponding to the parameters designated by the subscripts thereof which have been heretofore defined, and further provides a signal $E_T$ when the aircraft is turning toward a segment and a signal $E_f$ when the craft is flying toward the segment.

In this connection it is noted that the Microwave Landing System with which the invention may be used is of the type described in the Department of Transportation Publication (July 1971), entitled *National Plan For Development of the Microwave Landing System,* and particularly to pages 1–9 to 1–13 thereof.

Computer 2 may be of the general purpose digital type manufactured by the Navigation & Control Division of The Bendix Corporation and carrying the trade designation Bendix BDX-6200 Computer. Computer 2 computes the indicated outputs from the pilot and MLS inputs in accordance with trigonemetrical identities well known to those skilled in the art.

With further reference now to FIG. 3, aircraft bearing signal $E_\psi$ is applied through an amplifier 4 having a gain $K_1$ to a multiplier 6, and multiplied thereby by ground speed signal $E_{VG}$. Multiplier 6 provides a modified aircraft bearing signal $E_{\psi\ m}$. Signal $E_{\psi\ m}$ is applied to a summing means 8.

Segment displacement signal $E_D$ is applied through amplifier 10 having a gain $K_2$ to summing means 8 and summed thereby with modified aircraft bearing signal $E_{\psi\ m}$. The summation signal from summing means 8 is applied to a polarity detector 12.

The signal from amplifier 10 is applied to a polarity detector 14. The signals from polarity detector 12 and polarity detector 14 are applied to an exclusive OR gate 16. Gate 16 provides an output at a particular logic state when only one of the inputs therto is at tha logic state, and which output is applied to an OR gate 18.

Turn distance signal $E_{Dt}$ is applied to an OR gate 20 as is signal $E_T$. OR gate 20 provide an output at a particular logic level when one or both of the inputs thereto are at that logic level, and which output is applied to an inverting terminal of and AND gate 22. Signal $E_f$ is applied to a non-inverting input terminal of AND gate 22. AND gate 22 provides an output at a particular logic state when both inputs thereto are at that state, and which output is applied to OR gate 18.

The signal from amplifier 10 is applied to a normally open switch 24. The output from OR gate 18 actuates a relay 26 which closes switch 24 to apply the output from amplifier 10 to a summing means 28.

Modified aircraft bearing signal $E_{\psi\ m}$ is applied to a normally open switch 30. When aircraft turn distance signal $E_{Dt}$ is at a predetermined level the signal operates a relay 32 which closes switch 30 to apply $E_{\psi\ m}$ to summing means 28. The output from summing means 28 is applied to limiter 34 and which limiter 34 provides an aircraft roll command signal $\phi_C$. Signal $\phi_C$ may be applied to an autopilot or flight director system 36 controlling the flight of an aircraft as is well known in the art.

OPERATION OF THE INVENTION

In accordance with the structural arrangement described with reference to FIG. 3, it will be understood that when the aircraft is flying toward a particular segment either the segment displacement signal $E_D$ or the aircraft bearing signal $E_\psi$ affects roll command signal $\phi_C$ until the aircraft travels within a predetermined distance of the segment. This distance is a function of the aircraft ground speed and closing rate on the segment, and when the distance is reached modified aircraft bearing signal $E_{\psi\ m}$ affects roll command signal $\phi_C$ thereby causing the aircraft to initiate a constant rate turn.

The control configuration remains in this mode until a smaller second distance occurs when the combination of gain ($K_2$) X segment displacement signal ($E_D$) + ground speed signal ($E_{VG}$) X gain ($K_1$) X bearing signal ($E_\psi$) is of opposite polarity to segment displacement signal $E_D$ as determined by polarity detector 12. When this point is reached segment displacement signal $E_D$, adjusted by gain $K_2$, is combined with the modified aircraft bearing $E_{\psi\ m}$ from multiplier 6 to affect roll command signal $\phi_C$.

When the aircraft is not flying toward a segment, segment displacement signal $E_D$ affects the roll command signal. In this mode the aircraft continuously turns in a direction so that its yaw is of opposite polarity to the displacement from the segment as determined by polarity detector 14. Segment displacement signal $E_D$ is removed from the control channel and the turn is terminated when either the aircraft satisfies the previously mentioned conditions for roll command signal control by modifed aircraft bearing signal $E_{\psi\ m}$ or the aircraft has commenced to turn away from the segment.

In implementing the invention standard components of the type well known in the art may be used. Multiplier 6 may be, for purposes of illustration, a circuit such as that described in U.S. Pat. No. 3,588,713 issued on June 28, 1971 to Michael J. Yareck and assigned to The Bendix Corporation, assignee of the present invention. Polariy detectors 12 and 14 may be level detectors of the type described in U.S. Pat. No. 3,444,466 issued on May 13, 1969 to J. J. Lotwis, Jr. and assigned to The Bendix Corporation, assignee of the present invention. Limiter 84 may be a conventional clipping circuit such as that described at page 412, Electronics for Scientists, Malmsted et al., published by W. A. Benjamin, Inc. New York, N. Y. 1963. Gates 16, 18, 20 and 22 may also be of the conventional type such as described at pages 312 to 334, Pulse Digital and Switching Waveforms, Milman and Taub, published by the McGraw Hill Book Co., New York, N. Y., 1965.

It will now be seen from the aforegoing description of the invention that means have been provided for guiding an aircraft along a multi-segment path when landing the craft. A feature of the invention is that each of the segments is captured in an asymptotic manner. Two independently controlled signals are used to generate roll command information in contrast to the single signal control used in prior art landing systems. Asymptotic segment captures are assured in the presence of various wind and airspeed conditions due to the unique sequence of application of the signals. A segment capture mode for the aircraft departing from the segment is also provided. The device of the invention uses the particular characteristics of a microwave landing system and the relatively wide angle information provided thereby for accomplishing the above.

Although but a single embodiment of the invention has been illustrated and described in detail, it is to be expressly understood that the invention is not limited thereto. Various changes may also be made in the design arrangement of the parts without departing from the spirit and scope of the invention as the same will now be understood by those skilled in the art.

What is claimed is:

1. Apparatus for controlling an aircraft to fly a multi-segment path, comprising:
   signal providing means for providing a signal corresponding to the bearing of the craft relative to a segment to be captured, a signal corresponding to the ground speed of the craft; and a signal corresponding to the displacement of the craft from the segment at which a turn is initiated to capture the segment;
   means for combining the bearing signal and the ground speed signal;
   aircraft control means; and
   normally open switching means connecting the combining means and the control means, and connected to the signal providing means and closed by the turn displacement signal therefrom at a predetermined level for applying the combined signal to the control means for controlling the craft.

2. Apparatus as described in claim 1, including:
   the signal providing means further providing a signal corresponding to the displacement of the craft from the segment, a signal when the aircraft is turning toward the segment and a signal when the aircraft is flying toward the segment;
   means connecting the signal providing means to the control means and including other normally open switching means; and
   means connected to the signal providing means and to the combining means and responsive to the displacement signal, the signal when the aircraft is turning toward the segment, the signal when the aircraft is flying toward the segment, the turn displacement signal, and the signal from the combining means for closing the other switching means.

3. Apparatus as described by claim 2, wherein the connecting means further includes:
   means for combining the combined signal applied through the closed first mentioned switching means and the displacement signal applied through the closed other switching means.

4. Apparatus as described by claim 2, wherein the means connected to the signal providing means and to the combining means and responsive to the displacement signal, the signal when the aircraft is turning toward the segment, the signal when the aircraft is flying toward the segment, the turn displacement signal and the signal from the combining means for closing the other switching means includes:
   means for combining the combined signal and the displacement signal;
   means for providing a first signal in accordance with the sense of the combined signal from said combining means;
   means for providing a second signal in accordance with the sense of the displacement signal;
   means for comparing the first and second signals and providing a third signal at a particular state when one of the first and second signals is at that state;
   means for comparing the turn displacement signal and the signal when the aircraft is turning toward the segment and providing a fourth signal at a particular state when at least one of the compared signals is at that state;
   means for comparing the fourth signal and the signal when the aircraft is flying toward the segment and providing a fifth signal at a particular state when both of said compared signals are at that state; and
   means for comparing the third and fifth signals and providing a signal at a particular state for closing the second switching means when at least one of the compared signals is at that state.

5. Apparatus as described in claim 4, wherein the means for combining the combined signal and the displacement signal includes means for summing said signals.

6. Apparatus as described by claim 3, wherein the means for combining the combined signal applied through the closed first mentioned switching means and the displacement signal applied through the closed other switching means includes means for summing said signals.

7. Apparatus as described in claim 1, wherein the means for combining the bearing signal and the ground speed signal includes means for multiplying said signals.

8. Apparatus for controlling an aircraft to fly a multi-segment path, comprising:
   signal providing means for providing a signal corresponding to the displacement of the craft from a segment to be captured, a signal when the aircraft is turning toward the segment, a signal when the aircraft is flying toward the segment, and a signal corresponding to the displacement of the craft from the segment at which a turn is initiated to capture the segment;
   aircraft control means;
   normally open switching means connecting the signal providing means to the control means; and
   means connected to the signal providing means and responsive to the displacement signal, the turn displacement signal, the signal when the aircraft is turning toward the segment and the signal when the craft is flying toward the segment for closing the switching means to apply the displacement signal to the control means.

9. Apparatus as described by claim 8, wherein the means for closing the switching means includes:
   the signal providing means providing an aircraft ground speed signal and a signal corresponding to the bearing of the craft relative to the segment to be captured;
   means for combining the bearing signal, the ground speed signal and the displacement signal;
   means for providing a first signal in accordance with the sense of the combined signal;
   means for providing a second signal in accordance with the sense of the displacement signal;
   means for comparing the first and second signals and providing a third signal at a particular state when one of the first and second signals is at that state;
   means for comparing the turn displacment signal and the signal when the aircraft is turning toward the segment and providing a fourth signal at a particular state when at least one of the compared signals is at that state;

means for comparing the fourth signal and the signal when the aircraft is flying toward the segment and providing a fifth signal at a particular state when both of said compared signals are at that state; and means for comparing the third and fifth signals and providing a signal at a particular state for closing the switching means when at least one of the compared signals is at that state.

10. Apparatus as described by claim 9, wherein the means for combining the bearing signal, the ground speed signal and the displacement signal includes:

means for multiplying the bearing signal and the ground speed signal; and means for summing the multiplied signal and the displacement signal.

11. Apparatus as described in claim 8, including:

the signal providing means providing an aircraft ground speed signal and a signal corresponding to the bearing of the craft relative to the segment to be captured;

means for combining the bearing signal and the ground speed signal;

means connecting said combining means to the control means and including other normally open switching means; and the other normally open switching means connected to the signal providing means and closed by the turn displacement signal therefrom at a predetermined level for applying the combined signal to the control means.

12. Apparatus as described by claim 11, wherein the connecting means further includes:

means for combining the displacement signal applied through the closed first mentioned switching means and the combined signal applied through the closed other switching means.

\* \* \* \* \*